(12) United States Patent
Yu et al.

(10) Patent No.: US 8,042,744 B2
(45) Date of Patent: Oct. 25, 2011

(54) RFID TAG

(75) Inventors: Jiun-Jang Yu, Changhua County (TW);
Hsin-Hsien Yeh, Taichung (TW);
Hong-Ching Lin, Kaohsiung (TW);
Chiung-Hsiung Chen, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 247 days.

(21) Appl. No.: 12/506,367

(22) Filed: Jul. 21, 2009

(65) Prior Publication Data
US 2010/0116893 A1 May 13, 2010

(30) Foreign Application Priority Data

Nov. 13, 2008 (TW) ................................ 97143969 A
May 22, 2009 (TW) ................................ 98117144 A

(51) Int. Cl.
*G06K 19/06* (2006.01)
*G06K 7/08* (2006.01)
(52) U.S. Cl. ........ 235/492; 235/375; 235/380; 235/441; 235/451; 235/487; 340/572.1; 340/572.7
(58) Field of Classification Search .................. 235/375, 235/380, 451, 487, 492; 340/572.1, 572.7
See application file for complete search history.

(56) References Cited

U.S. PATENT DOCUMENTS

| 6,501,435 B1 * | 12/2002 | King et al. ..................... 343/795 |
| 7,215,295 B2 | 5/2007 | Egbert |
| 7,336,243 B2 | 2/2008 | Jo et al. |
| 7,339,550 B2 | 3/2008 | Hayama |
| 7,434,739 B2 * | 10/2008 | Matsuura et al. ............ 235/492 |
| 2002/0175873 A1 * | 11/2002 | King et al. .................. 343/767 |
| 2006/0054710 A1 * | 3/2006 | Forster et al. ................ 235/492 |
| 2007/0164867 A1 * | 7/2007 | Kawai ........................ 340/572.7 |

\* cited by examiner

*Primary Examiner* — Thien M. Le
*Assistant Examiner* — Tuyen K Vo
(74) *Attorney, Agent, or Firm* — Thomas|Kayden

(57) ABSTRACT

A radio frequency identification (RFID) tag including a substrate, an RFID chip, a chip contact part, a folding circuit and a radiation part is provided. The chip contact part is formed on the substrate and electrically coupled to the RFID chip. The folding circuit is formed on the substrate and electrically coupled to the chip contact part. The folding circuit has a winding part, which forms a hollow region, for compensating the antenna electric length. The radiation part is formed on the substrate and electrically coupled to the folding circuit, wherein one terminal of the winding part of the folding circuit is open, and the other terminal is electrically coupled to the radiation part. At least one of the folding circuit and the radiation part is asymmetric to the chip contact part.

11 Claims, 5 Drawing Sheets

RFID TAG

This application claims the benefits of Taiwan applications Serial No. 97143969, filed Nov. 13, 2008, and Serial No. 98117144, filed May 22, 2009, the subject matter of which is incorporated herein by reference.

TECHNICAL FIELD

The application relates in general to an RFID tag, and more particularly to an RFID tag having a folding circuit for compensating the antenna electric length.

BACKGROUND

Radio frequency identification (RFID) system uses radio waves to transmit identification data such that the user can obtain required data wirelessly. RFID system includes a radio frequency identification (RFID) tag and a reader.

An RFID tag is mainly constituted by an RFID chip and a tag antenna. The RFID chip of the RFID tag stores corresponding identification data such as product name, supplier, and replenish data. The tag antenna of the RFID tag will perform wireless transmission between the reader, to obtain required data.

The cost of the RFID tag is mainly caused by the RFID chip, the metal usage in the tag antenna and the tag manufacturing process (such as package). The cost of the RFID tag will be cut down if the metal usage in the RFID tag antenna can be reduced.

Let a commonly RFID tag be taken for example. Its size is normally 1×4 inches (25 mm×100 mm), its length is smaller than ½ times of the wavelength of UHF frequency band (900 MHz: 135 mm), the metal coverage rate is about 20%~80% of the total area, and the metal coverage rate of the tag antenna is an important factor that makes the tag cost difficult to be reduced.

Of the current technologies, the RFID tag antenna normally adopts the meandering design to compensate the antenna electric length. As the tag antennas adopt a larger metal plane with a larger coverage rate, the material and cost of the tag can hardly be reduced further.

Thus, the application provides an RFID tag.

BRIEF SUMMARY

Exemplary embodiment of a radio frequency identification (RFID) tag is disclosed. One terminal of the folding circuit is open for compensating the antenna electric length.

In exemplary embodiment of an RFID tag, the shape constituted by the folding circuit and the radiation part can be hollow. The folding circuit and the radiation part are asymmetric to a chip contact part.

In still exemplary embodiment of an RFID tag, the current flow of the radiation part has consistence.

An embodiment of an RFID tag including a substrate, an RFID chip, and a chip contact part is provided. The chip contact part is formed on the substrate and electrically coupled to the RFID chip. The folding circuit is formed on the substrate, and electrically coupled to the chip contact part. The folding circuit has a winding part forming a hollow region. The radiation part is formed on the substrate and electrically coupled to the folding circuit, wherein a first terminal of the winding part of the folding circuit is open, and a second terminal thereof is electrically coupled to the radiation part. At least one of the folding circuit and the radiation part is asymmetric to the chip contact part.

It is to be understood that both the foregoing general description and the following detailed description are exemplary and explanatory only and are not restrictive of the disclosed embodiments, as claimed.

DETAILED DESCRIPTION OF EXEMPLARY EMBODIMENT OF THE INVENTION

According to the embodiments of the invention, the folding circuit with open terminal is used for electrically coupling the chip contact part and the radiation part. Besides, the folding circuit and the radiation part can be hollowed so as to reduce metal coverage rate and cut down the cost of the RFID tag. Furthermore, the current flow of the radiation part has consistence so as to enhance radiation effect. The folding circuit is asymmetric to a chip contact part; and/or the radiation part is asymmetric to the chip contact part.

Figure 1:
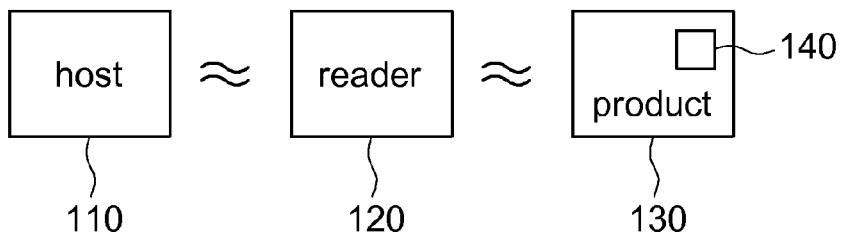
FIG. 1 shows an application of RFID.

FIG. 1 shows an application of RFID. As indicated in FIG. 1, the reader 120 transmits a radio signal and power to the RFID tag 140 of the product 130. The RFID tag 140 transmits the corresponding data of the product 130 back to the reader 120. The host 110 receives the data transmitted from the reader 120. In this way, the host 110 is able to read corresponding data of the product 130 wirelessly.

First Embodiment

Figure 2:
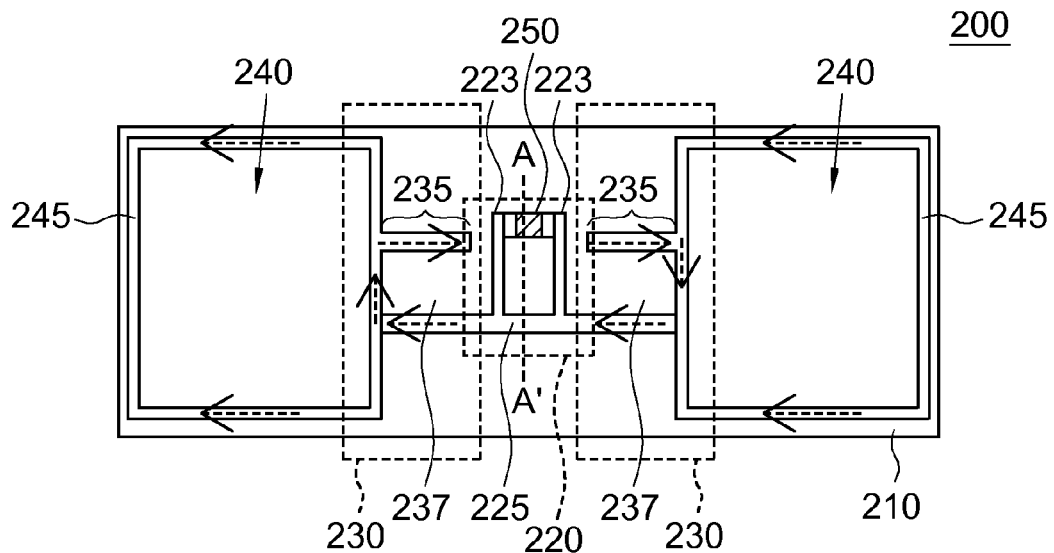
FIGS. 2~11 show RFID tags according to first to tenth exemplary embodiments, respectively.

FIG. 2 shows an RFID tag according to a first embodiment of the invention. As indicated in FIG. 2, the RFID tag 200 of the first embodiment of the invention at least includes a substrate 210, an RFID chip 250, a chip contact part 220, a folding circuit 230 and a radiation part 240. The chip contact part 220 is formed on the substrate 210 and electrically coupled to the RFID chip 250. The folding circuit 230 is formed on the substrate 210 and electrically coupled to the chip contact part 220. The folding circuit 230 has a winding part 235, which forms a hollow region 237. The radiation part 240 is formed on the substrate 210 and electrically coupled to the folding circuit 230. One terminal of the winding part 235 of the folding circuit 230 is open, and the other terminal is electrically coupled to the radiation part 240.

The substrate 210 has dielectric properties. For example, the substrate 210 can be made from plastics such as polyethylene terephthalate (PET). The chip contact part 220, the folding circuit 230 and the radiation part 240 are all formed on the substrate 210.

Besides, the chip contact part 220 further includes a chip bonding pad 223 for placing the RFID chip 250, such that the RFID chip 250 is electrically coupled to the RFID tag 200. The bonding between the chip bonding pad 223 and the RFID chip 250 is disclosed below. The chip bonding pad 223 transmits the energy received from the reader by the antenna of the RFID tag 200 to the RFID chip 250.

In order to make the impedance matching between the antenna and the RFID chip 250 for better power transmission, the chip contact part 220 further includes an impedance matching circuit 225 electrically coupled to the chip bonding pad 223. When the RFID tag is pasted on different object, the impedance of the RFID antenna 200 will change. The impedance change can be compensated by the impedance matching circuit 225. Despite the impedance matching circuit 225 of FIG. 2 is U-shaped, exemplary embodiments of the invention are not limited thereto, and the impedance matching circuit 225 can be in other shapes.

The folding circuit 230 can be folded to compensate the antenna electric length required by the radiation part 240. The folding circuit 230 electrically couples the chip contact part 220 to the radiation part 240. To be more precisely, the folding circuit 230 is positioned between the chip contact part 220 and the radiation part 240.

The folding circuit 230 is coupled to the radiation part 240 and then folded to form a winding part 235, which forms a hollow region 237. In the present embodiment of the invention, the hollow region 237 is in square. However, the hollow region 237 can be in the shape of a regular polygon such as triangle, circle, and so on or in the shape of an irregular polygon, but exemplary embodiments of the invention are not limited thereto. As indicated in FIG. 2, if one terminal of the winding part 235 is electrically coupled to the radiation part 240, then the other terminal is open. Furthermore, despite the winding part 235 of FIG. 2 is a straight line, the winding part 235 can be in a regular shape or in an irregular shape such as an arced line or a meander line.

The radiation part 240 and the folding circuit 230 are coupled to form a loop. The internal current flow (indicated by an arrow) of the radiation part 240 has consistence, and the current can flow to or from the folding circuit 230 so as to enhance the radiation transmitting/receiving effect of the radiation part 240. Besides, to further enhance the radiation efficiency of the radiation part 240, the terminal 245 of the radiation part 240 can be further widened.

The radiation part 240 can be in the shape of a regular polygon such as rectangle, circle, trapezoid and triangle or in the shape of an irregular polygon. Furthermore, to further reduce the metal coverage rate, the radiation part 240 is hollowed. That is, the radiation part 240 is merely surrounded by antennas and is hollow inside.

As shown in FIG. 2, the folding circuit 230 is symmetric to the chip contact part 220 (for example, the dotted line A-A' in FIG. 2); and the radiation part 240 is also symmetric to the chip contact part 220.

The RFID tag 200 can be formed on the substrate 210 according to thick-film or thin-film manufacturing process, for example by way of printing, etching, electroplating.

In the first embodiment of the invention, the average gain of the RFID tag 200 is 1.93 dBi, the metal coverage rate is 11.0%, and the read range is 6.58 M (meter).

Second Embodiment

Figure 3:
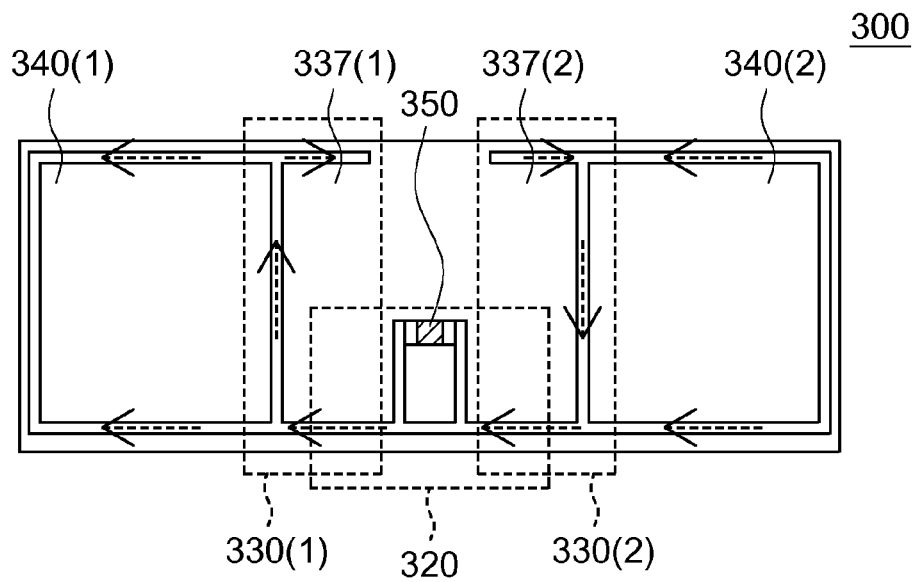

FIG. 3 shows an RFID tag 300 according to a second embodiment of the invention. In FIG. 3, a first radiation part 340 (1), a first folding circuit 330 (1), a chip contact part 320, a second folding circuit 330 (2) and a second radiation part 340 (2) are sequentially illustrated from left to right. In greater details, the folding circuit includes the first folding circuit 330 (1) and the second folding circuit 330 (2) which are respectively disposed at two sides of the chip contact part 320; the radiation part includes the first radiation part 340 (1) and the second radiation part 340 (2) which are respectively disposed at two sides of the first folding circuit 330 (1) and the second folding circuit 330 (2). Besides, the first folding circuit 330 (1) and the second folding circuit 330 (2) respectively correspond to (for example, have similar functions with) the folding circuit 230 of FIG. 2, and the first radiation part 340 (1) and the second radiation part 340 (2) respectively correspond to (for example, have similar functions with) the radiation part 240 of FIG. 2.

Compared with the RFID tag 200, the RFID tag 300 may have different sizes and shapes of the folding circuit and the radiation part, but the performance is still excellent.

In the RFID tag 300 of the second embodiment of the invention, the average gain is 1.89 dBi, the metal coverage rate is 11%, and read range is 6.55 M.

In FIG. 3, the first folding circuit 330 (1) and the second folding circuit 330 (2) is symmetric to the chip contact part 320; but the first folding circuit 330 (1) and the second folding circuit 330 (2) may be asymmetric to the chip contact part 320. That is, the shape of the first hollow region 337 (1) can be the same or different with that of the second hollow region 337 (2). The shapes of the first radiation part 340 (1) and the second radiation part 340 (2) may be symmetric or asymmetric to the chip contact part 320; and the size of the first radiation part 340 (1) can be the same or different with that of the second radiation part 340 (2).

Third Embodiment

Figure 4:
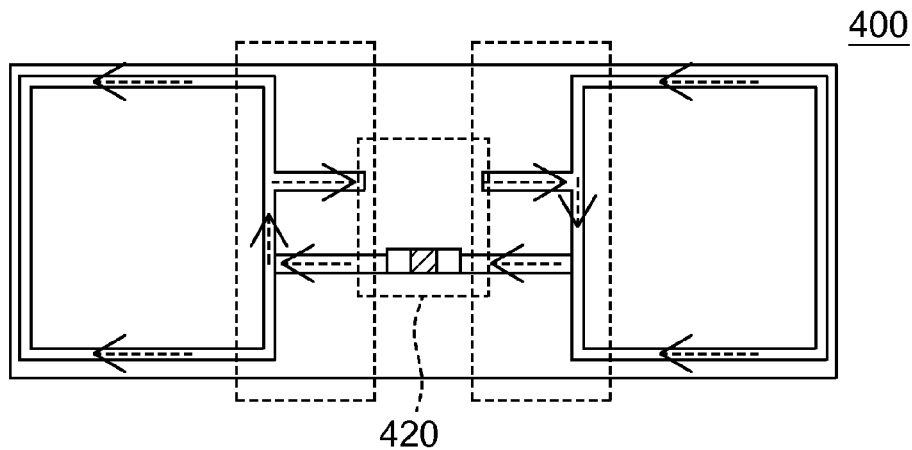

FIG. 4 shows an RFID tag 400 according to a third embodiment of the invention. Compared with the first embodiment, the chip contact part 420 of the RFID tag 400 does not include any impedance matching circuit. However, in consideration of the impedance match between the radiation part and the RFID chip, in design of the RFID chip or the chip contact part, the impedance match factor may be considered.

Compared with the RFID tag 200, the RFID tag 400 may have different sizes and shapes of the folding circuit and the radiation part, but the performance is still excellent.

Fourth Embodiment

Figure 5:
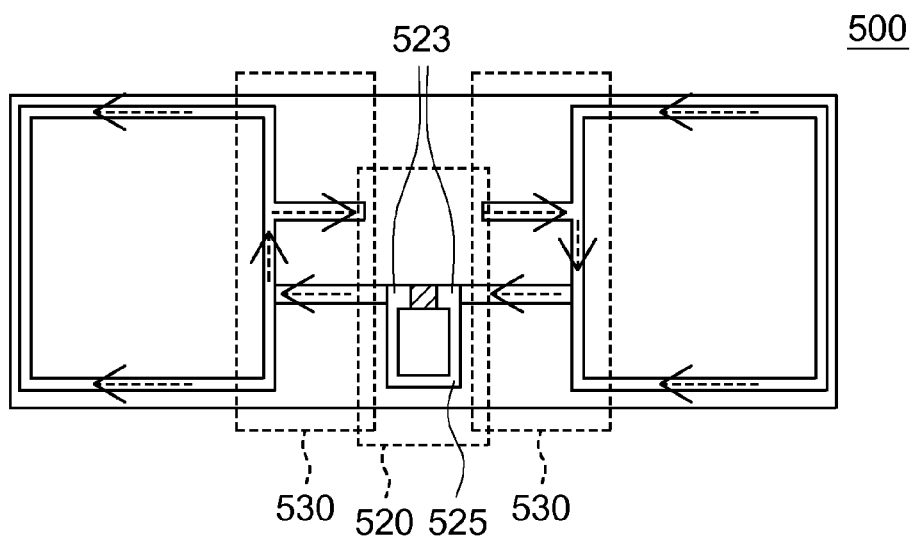

FIG. 5 shows an RFID tag 500 according to a fourth embodiment of the invention. In the first embodiment of the invention, the impedance matching circuit 225 of the chip contact part 220 is electrically coupled to the folding circuit 230. However, in the fourth embodiment of the invention, the impedance matching circuit 525 of the chip contact part 520 of the RFID tag 500 is not electrically coupled to the folding circuit 530, but the chip bonding pad 523 of the chip contact part 520 is electrically coupled to the folding circuit 530. That is, in the above or other embodiments of the invention, the folding circuit and the chip contact part can be coupled by a chip bonding pad, an impedance matching circuit or other parts of the chip contact part.

In the above or other embodiments of the invention, the winding of the folding circuits at two sides are symmetric or non-symmetric to each other; the shapes of the radiation parts at two sides are symmetric or non-symmetric to each other; the shapes of the radiation part at two sides are the same or different.

In the above embodiments of the invention, the folding circuits at two sides are symmetric to the chip contact part; and the radiation parts at two sides are also symmetric to the chip contact part. However, in other embodiments of the invention, the folding circuits at two sides may be asymmetric to the chip contact part; and the radiation parts at two sides may be symmetric or asymmetric to the chip contact part. In still other embodiments of the invention, the radiation parts at two sides may be asymmetric to the chip contact part; and the folding circuits at two sides may be symmetric or asymmetric to the chip contact part. In yet still other embodiments of the invention, the radiation parts at two sides and the folding circuits at two sides are both asymmetric to the chip contact part.

Fifth Embodiment

Figure 6:
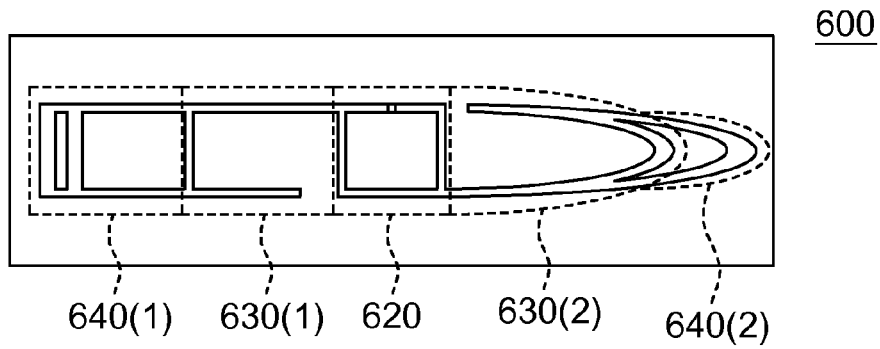

FIG. 6 shows an RFID tag 600 according to a fifth embodiment of the invention. In FIG. 6, a first radiation part 640 (1), a first folding circuit 630 (1), a chip contact part 620, a second folding circuit 630 (2) and a second radiation part 640 (2) are sequentially illustrated from left to right.

In greater details, the folding circuit includes the first folding circuit 630 (1) and the second folding circuit 630 (2) which are respectively disposed at two sides of the chip contact part 620. The first folding circuit 630 (1) and the second folding circuit 630 (2) are asymmetric to the chip contact part 620.

The radiation part includes the first radiation part 640 (1) and the second radiation part 640 (2) which are respectively disposed at two sides of the first folding circuit 630 (1) and the second folding circuit 630 (2). The first radiation part 640 (1) and the second radiation part 640 (2) are asymmetric to the chip contact part 620.

Compared with the RFID tag 200, the RFID tag 600 may have different sizes and shapes of the folding circuit and the radiation part, but the performance is excellent.

In the RFID tag 600 of the fifth embodiment of the invention, the average gain is 1.95 dBi, the metal coverage rate is 12%, and read range is 6.59 M.

Sixth Embodiment

Figure 7:
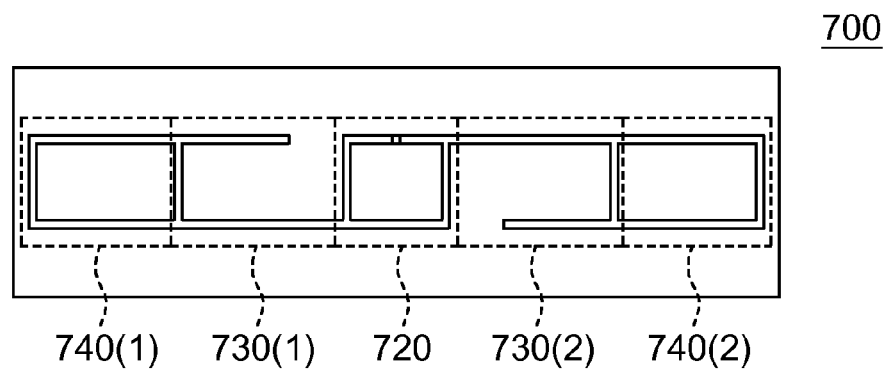

FIG. 7 shows an RFID tag 700 according to a sixth embodiment of the invention. In FIG. 7, a first radiation part 740 (1), a first folding circuit 730 (1), a chip contact part 720, a second folding circuit 730 (2) and a second radiation part 740 (2) are sequentially illustrated from left to right.

The first folding circuit 730 (1) and the second folding circuit 730 (2) are asymmetric to the chip contact part 720; and the first radiation part 740 (1) and the second radiation part 740 (2) are symmetric to the chip contact part 720.

Compared with the RFID tag 200, the RFID tag 700 may have different sizes and shapes of the folding circuit, but the performance is excellent.

In the RFID tag 700 of the sixth embodiment of the invention, the average gain is 2.18 dBi, the metal coverage rate is 11%, and read range is 6.76 M.

Seventh Embodiment

Figure 8:
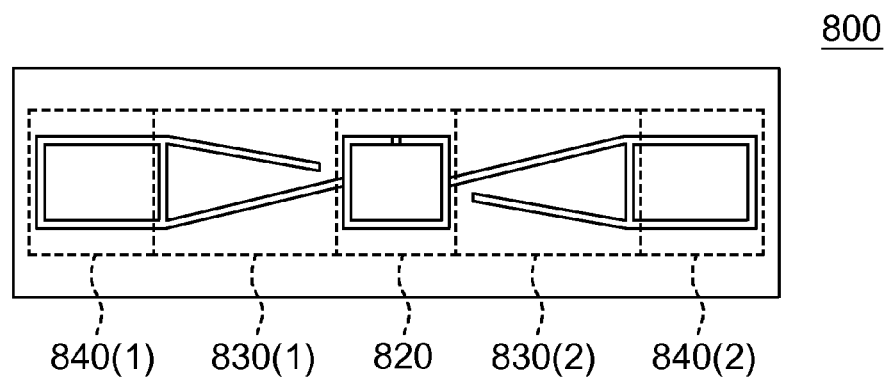

FIG. 8 shows an RFID tag 800 according to a seventh embodiment of the invention. In FIG. 8, a first radiation part 840 (1), a first folding circuit 830 (1), a chip contact part 820, a second folding circuit 830 (2) and a second radiation part 840 (2) are sequentially illustrated from left to right.

The first folding circuit 830 (1) and the second folding circuit 830 (2) are asymmetric to the chip contact part 820; and the first radiation part 840 (1) and the second radiation part 840 (2) are symmetric to the chip contact part 820.

Compared with the RFID tag 200, the RFID tag 800 may have different sizes and shapes of the folding circuit, but the performance is excellent.

In the RFID tag 800 of the seventh embodiment of the invention, the average gain is 2.1 dBi, the metal coverage rate is 12%, and read range is 6.7 M.

Eighth Embodiment

Figure 9:
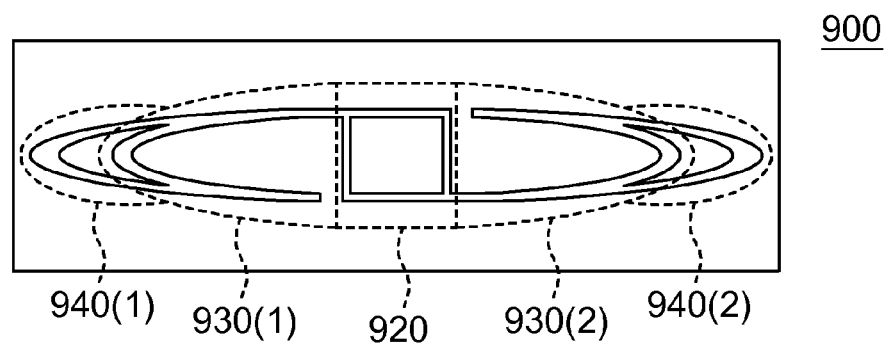

FIG. 9 shows an RFID tag 900 according to an eighth embodiment of the invention. In FIG. 9, a first radiation part 940 (1), a first folding circuit 930 (1), a chip contact part 920, a second folding circuit 930 (2) and a second radiation part 940 (2) are sequentially illustrated from left to right.

The first folding circuit 930 (1) and the second folding circuit 930 (2) are asymmetric to the chip contact part 920; and the first radiation part 940 (1) and the second radiation part 940 (2) are symmetric to the chip contact part 920.

Compared with the RFID tag 200, the RFID tag 900 may have different sizes and shapes of the folding circuit, but the performance is excellent.

In the RFID tag 900 of the eighth embodiment of the invention, the average gain is 1.98 dBi, the metal coverage rate is 12%, and read range is 6.61 M.

Ninth Embodiment

Figure 10:
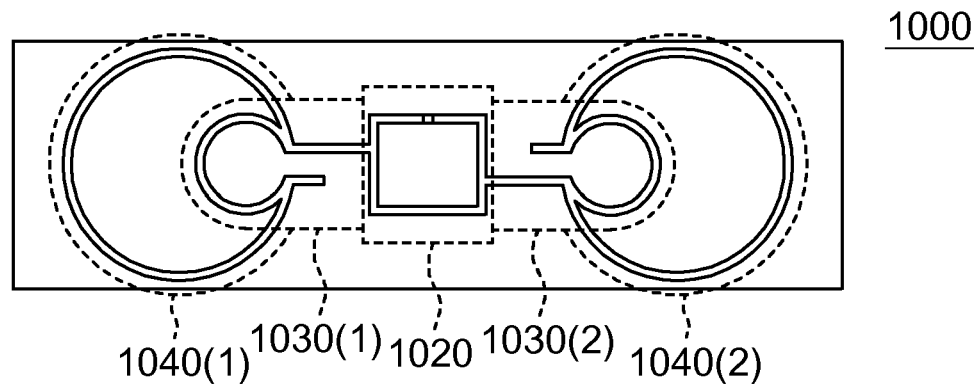

FIG. 10 shows an RFID tag 1000 according to a ninth embodiment of the invention. In FIG. 10, a first radiation part 1040 (1), a first folding circuit 1030 (1), a chip contact part 1020, a second folding circuit 1030 (2) and a second radiation part 1040 (2) are sequentially illustrated from left to right.

The first folding circuit 1030 (1) and the second folding circuit 1030 (2) are asymmetric to the chip contact part 1020; and the first radiation part 1040 (1) and the second radiation part 1040 (2) are symmetric to the chip contact part 1020.

Compared with the RFID tag 200, the RFID tag 1000 may have different sizes and shapes of the folding circuit, but the performance is excellent.

In the RFID tag 1000 of the ninth embodiment of the invention, the average gain is 2.14 dBi, the metal coverage rate is 13%, and read range is 6.37 M.

Tenth Embodiment

Figure 11:
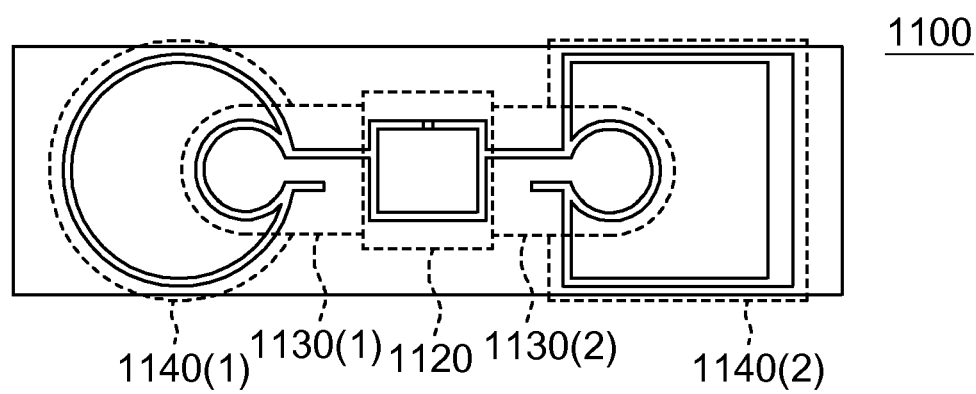

FIG. 11 shows an RFID tag 1100 according to a tenth embodiment of the invention. In FIG. 11, a first radiation part 1140 (1), a first folding circuit 1130 (1), a chip contact part 1120, a second folding circuit 1130 (2) and a second radiation part 1140 (2) are sequentially illustrated from left to right.

The first folding circuit 1130 (1) and the second folding circuit 1130 (2) are symmetric to the chip contact part 1120; and the first radiation part 1140 (1) and the second radiation part 1140 (2) are asymmetric to the chip contact part 1120.

Compared with the RFID tag 200, the RFID tag 1100 may have different sizes and shapes of the folding circuit, but the performance is excellent.

In the RFID tag 1100 of the tenth embodiment of the invention, the average gain is 2.05 dBi, the metal coverage rate is 14%, and read range is 6.66 M.

In the above sixth, seventh, eighth and ninth embodiments, the folding circuits on two sides are asymmetric to each other while the radiation parts on two sides are symmetric to each other. The difference between the above sixth, seventh, eighth and ninth embodiments relies on the shapes (triangle, square, circle, ellipse or crescent) and sizes of the folding circuits and the radiation parts may be different and accordingly different results are obtained. People skilled in the art may design the folding circuits and the radiation parts with other shapes without departing from the broad inventive concept thereof. The folding circuits and the radiation parts of the disclosed embodiments are not limited to the particular examples disclosed.

Coupling Between the Chip Contact Part and the RFID Chip

Figure 12A:
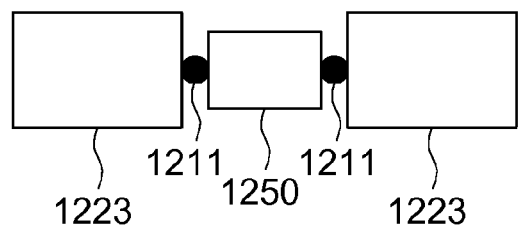
FIGS. 12A~FIG. 12D are examples showing the coupling between a chip contact part and a RFID chip.
Figure 12B:
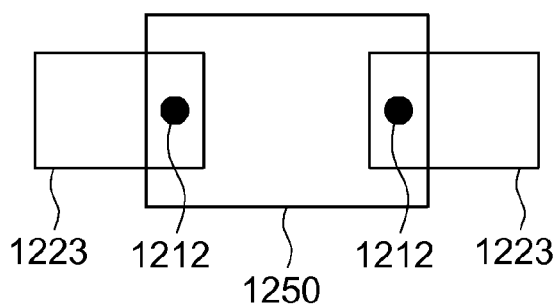
Figure 12C:
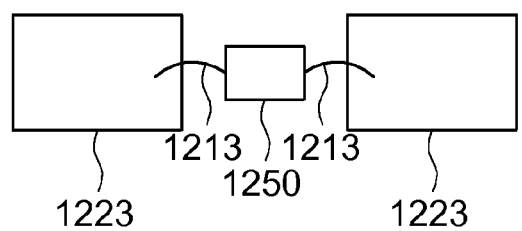
Figure 12D:
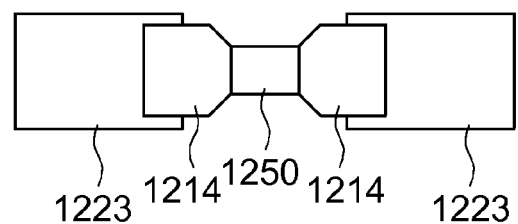

FIGS. 12A~FIG. 12D are examples showing the coupling between a chip contact part and a RFID chip applied in the above or other embodiments of the invention. In FIG. 12A and FIG. 12B, the chip bonding pad 1223 and the RFID chip 1250 are coupled via metal contact points 1211 and 1212. In FIG. 12C and FIG. 12D, the chip bonding pad 1223 and the RFID chip 1250 are coupled via bonding wires 1213 and 1214.

In the embodiments of the invention, one terminal of the folding circuit is open for compensating the antenna electric length, such that the RFID tag has an excellent antenna gain and a long read range. Furthermore, the folding circuit and the radiation part can be hollowed so as to reduce the metal coverage rate and cut down the cost of RFID tag. Besides, the internal current of the radiation part has consistence so as to enhance radiation effect. Furthermore, the folding circuit and the radiation part are thin metal wires, rather than large metal planes.

It will be appreciated by those skilled in the art that changes could be made to the disclosed embodiments described above without departing from the broad inventive concept thereof. It is understood, therefore, that the disclosed embodiments are not limited to the particular examples disclosed, but is intended to cover modifications within the spirit and scope of the disclosed embodiments as defined by the claims that follow.

What is claimed is:

1. A radio frequency identification (RFID) tag, comprising:
a substrate;
an RFID chip formed on the substrate;
a chip contact part formed on the substrate and electrically coupled to the RFID chip;
a folding circuit formed on the substrate and electrically coupled to the chip contact part, wherein the folding circuit has a winding part forming a hollow region; and
a radiation part formed on the substrate and electrically coupled to the folding circuit;
wherein
a first terminal of the winding part of the folding circuit is open, and a second terminal thereof is electrically coupled to the radiation part; and
at least one of the folding circuit and the radiation part is asymmetric to the chip contact part.

2. The RFID tag according to claim 1, wherein the chip contact part comprises a chip bonding pad for placing the RFID chip.

3. The RFID tag according to claim 2, wherein the chip contact part further comprises an impedance matching circuit electrically coupled to the chip bonding pad.

4. The RFID tag according to claim 3, wherein the folding circuit is electrically coupled to the impedance matching circuit of the chip contact part.

5. The RFID tag according to claim 2, wherein the folding circuit is electrically coupled to the chip bonding pad of the chip contact part.

6. The RFID tag according to claim 1, wherein the winding part of the folding circuit is a straight line, an arced line or a meander line.

7. The RFID tag according to claim 1, wherein the internal current of the radiation part flows to or from the chip contact part.

8. The RFID tag according to claim 1, wherein:
the folding circuit comprises a first folding circuit and a second folding circuit disposed at two sides of the chip contact part; and
at least one of a winding, a shape or a size of the first folding circuit is asymmetric to that of the second folding circuit.

9. The RFID tag according to claim 8, wherein:
the radiation part comprises a first radiation part and a second radiation part respectively disposed at two sides of the first folding circuit and the second folding circuit; and
at least one of a winding, a shape or a size of the first radiation part is asymmetric to that of the second radiation part.

10. The RFID tag according to claim 1, wherein the hollow region is in shape of a regular polygon including triangle, square or circle, or in shape of an irregular polygon.

11. The RFID tag according to claim 1, wherein the radiation part is hollow and is in shape of a regular polygon including rectangle, circle, trapezoid or triangle, or in shape of an irregular polygon.

* * * * *